US011816806B2

(12) United States Patent
Semianov et al.

(10) Patent No.: US 11,816,806 B2
(45) Date of Patent: Nov. 14, 2023

(54) SYSTEM AND METHOD FOR FOOT SCANNING VIA A MOBILE COMPUTING DEVICE

(71) Applicant: Neatsy, Inc., Menlo Park, CA (US)

(72) Inventors: Konstantin Semianov, Menlo Park, CA (US); Anton Lebedev, Menlo Park, CA (US); Artem Semyanov, Menlo Park, CA (US)

(73) Assignee: Neatsy, Inc., Menlo Park, CA (US)

( * ) Notice: Subject to any disclaimer, the term of this patent is extended or adjusted under 35 U.S.C. 154(b) by 0 days.

(21) Appl. No.: 17/103,877

(22) Filed: Nov. 24, 2020

(65) Prior Publication Data

US 2021/0097777 A1 Apr. 1, 2021

Related U.S. Application Data

(63) Continuation of application No. PCT/US2020/070248, filed on Jul. 8, 2020.
(Continued)

(51) Int. Cl.
*A43D 1/02* (2006.01)
*G06T 19/20* (2011.01)
(Continued)

(52) U.S. Cl.
CPC ............... *G06T 19/20* (2013.01); *G06T 7/70* (2017.01); *G06T 17/10* (2013.01); *A43D 1/02* (2013.01);
(Continued)

(58) Field of Classification Search
CPC ............ A43D 1/02; G06T 2207/10028; G06T 2207/20084; G06T 2207/30196
See application file for complete search history.

(56) References Cited

U.S. PATENT DOCUMENTS 8,838,263 B2   9/2014   Sivak et al.
2009/0051683 A1   2/2009   Goonetilleke et al.
(Continued)

FOREIGN PATENT DOCUMENTS

CN   106997605 A   8/2017
KR   20180065229 A   6/2018
WO   2018148841 A1   8/2018

OTHER PUBLICATIONS

Zhang et al., RealPoint3D: An Efficient Generation Network for 3D Object Reconstruction From a Single Image, May 14, 2019, Digital Object Identifier 10.1109/ACCESS.2019.2914150, pp. 57539-57549.*

(Continued)

*Primary Examiner* — Matthew Salvucci
(74) *Attorney, Agent, or Firm* — Rimon PC

(57) ABSTRACT

The proposed approach is a system and method that allows a user to calculate a 3D model for each of his or her feet using a simple reference object and a mobile computing device with one or more cameras and/or one or more sensors. The mobile computing device moves around the user's feet to scan and/or capture data of his or her feet via the camera and/or the sensors. The captured sensor data is then processed by the mobile computing device to create two sets of 3D (data) point sets (also referred to as "point clouds"). These point clouds are then matched to a 3D model of an average foot to establish a correspondence between the point clouds and the 3D model. Once the correspondence is established, the mobile computing device is configured to fit one or more morphable models to the user's feet.

33 Claims, 7 Drawing Sheets

Related U.S. Application Data

(60) Provisional application No. 62/871,981, filed on Jul. 9, 2019.

(51) Int. Cl.
  *G06T 7/70*  (2017.01)
  *G06T 17/10*  (2006.01)

(52) U.S. Cl.
  CPC .............. *G06T 2207/10028* (2013.01); *G06T 2207/20084* (2013.01); *G06T 2207/30124* (2013.01); *G06T 2207/30196* (2013.01)

(56) References Cited

U.S. PATENT DOCUMENTS

| | | |
|---|---|---|
| 2015/0032242 A1 | 1/2015 | Schouwenburg et al. |
| 2017/0270709 A1 | 9/2017 | Tran et al. |
| 2020/0000180 A1* | 1/2020 | Sherrah .................. A43D 1/025 |

OTHER PUBLICATIONS

Lunscher, et al. Point Cloud Completion of Foot Shape from a Single Depth Map for Fit Matching using Deep Learning View Synthesis, 2014 IEEE International Conference on Computer Vision Workshops (ICCVW) [online] Jan. 23, 2018.

PCT International Search Report and Written Opinion for PCT/US20/0248, dated Sep. 16, 2020.

Mar. 16, 2022; CN First Office Action, application No. 202080049740.8.

\* cited by examiner

SYSTEM AND METHOD FOR FOOT SCANNING VIA A MOBILE COMPUTING DEVICE

CROSS-REFERENCE TO RELATED APPLICATION

This application is a continuation of PCT International Application No. PCT/US20/70248, filed Jul. 8, 2020, which claims the benefit of U.S. Provisional Patent Application No. 62/871,981, filed Jul. 9, 2019. Both of which are incorporated herein in their entirety by reference.

BACKGROUND

In the footwear industry, the dimensions of most shoes are represented by a single number. The shoe size is based on the width and the length of the foot, from heel to toe, which can be determined with the help of a foot measuring scale. Unfortunately, the correspondence between the width and the length of the foot and the size of the shoe is not an agreed-upon industry standard. This is because, in designing their products, footwear manufacturers always have a particular target audience in mind. Their concept of what an average person looks like becomes the basis for a unique system of shoe sizes.

A person who is buying a new type of shoe or is considering shoes from a brand he or she has not bought from before must therefore be very careful when making a selection. At a physical store location, even after measuring his or her foot size, the client might still have to try on different brands and sizes. It is often inconvenient to travel to physical store locations and, according to surveys conducted by the authors of this patent, 50% of clients say that they do not have enough time to try on the shoes they like.

Shopping online is more convenient but can also be more stressful: survey results show that 75% of clients say that they invest too much effort in ordering shoes that fit just right and 70% of clients who choose not to shop online say that they are afraid of getting the size wrong. Those that complete the ordering process have a chance to try on their shoes when they are delivered to them, but 40% say that they do not like trying on shoes in a hurry, while someone is waiting for them. In the end, the clients often end up with shoes that do not fit them well and must return them to the retailer. Surveys also show that, every time a return in an online store is completed, the business loses between 10% and 20% of the product cost to transportation expenses and suffers additional expenses for processing the returned product at the warehouse. Furthermore, there is a risk that the product will fall out of fashion while being shipped to and from the client and would need to be sold at clearance prices. Overall, this high rate of return from online purchases, 50% of the total sold, results in a loss of 150 billion dollars every year.

The problem of measuring feet with high precision and in terms of a wide range of parameters (ball width, arch height, instep height, heel width, etc.) is familiar to retailers of footwear for professional athletes and there is a wide range of stationary devices that address this need. Some are based on measurements produced by a moving laser beam (U.S. Pat. No. 4,745,290 to Frankel et al., U.S. Pat. No. 5,164,793 to Wolfersberger et al and U.S. Pat. No. 5,237,520 to White), while others involve a complex array of imaging sensors (U.S. Pat. No. 5,911,126 to Massen, U.S. Pat. No. 7,978,378 to Pishdadian et al., and U.S. Pat. No. 10,282,773 to Andon). Still others record pressure measurements (U.S. Patent No. 10,188,319 to Schwartz) or process imprints on a foam member (U.S. Pat. No. 6,735,547 to Yfantis). Unfortunately, these devices are inaccessible to ordinary consumers due to their cost and complexity. U.S. Pat. No. 10,002,376 to Cagner et al. discloses a foot measurement method involving a mobile computing device but the proposed system is unable to describe a user's foot in terms of a full range of three-dimensional or 3D parameters.

BRIEF SUMMARY OF THE INVENTION

The proposed approach is a system and method that allows a user to calculate a three dimensional or 3D model for each of his or her feet using a simple reference object and a mobile computing device with one or more imaging devices, which for non-limiting examples, can include a RGB (ordinary) camera and a depth camera, and/or one or more sensors, which for a non-limiting example, can include an inertial measurement unit (IMU). The mobile computing device moves around the user's feet to scan, collect, and/or capture data of his or her feet via the camera and/or the sensors. The captured data is then processed by the mobile computing device to create one or more sets of 3D points or datasets (also referred to as "point clouds"). Each of these point clouds are then matched to a 3D model of an average corresponding foot to establish a correspondence between the point clouds and the 3D models. Once the correspondence is established, the mobile computing device is configured to fit one or more morphable models to the splitted point clouds of the user's feet.

In some embodiments, the one or more morphable models can be further processed locally by the mobile computing device or remotely by an external computing system/server to describe the user's feet in terms of one or more parameters including but not limited to foot width, arch height, instep height, and other parameters of the user's feet used by major manufacturers in describing their footwear. Alternatively, the one or more morphable models can be passed on/transmitted directly to a compatible online merchant, e.g., an online footwear store. The proposed approach is a simple, low-cost solution, requiring no special hardware, thus allowing both casual users and professional athletes to shop for their shoes with confidence from the convenience of their own homes.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

The proposed approach is a system and method that allows a user to calculate a 3D model of his or her feet using a simple reference object and a mobile computing device with one or more imaging devices and/or one or more sensors, e.g., an inertial measurement unit. In the following description, numerous specific details are set forth in order to provide a more thorough description of the proposed approach. It will be apparent, however, to one skilled in the art, that the proposed approach may be practiced without these specific details. In other instances, well-known features have not been described in detail so as not to obscure the proposed approach.

Figure 1:
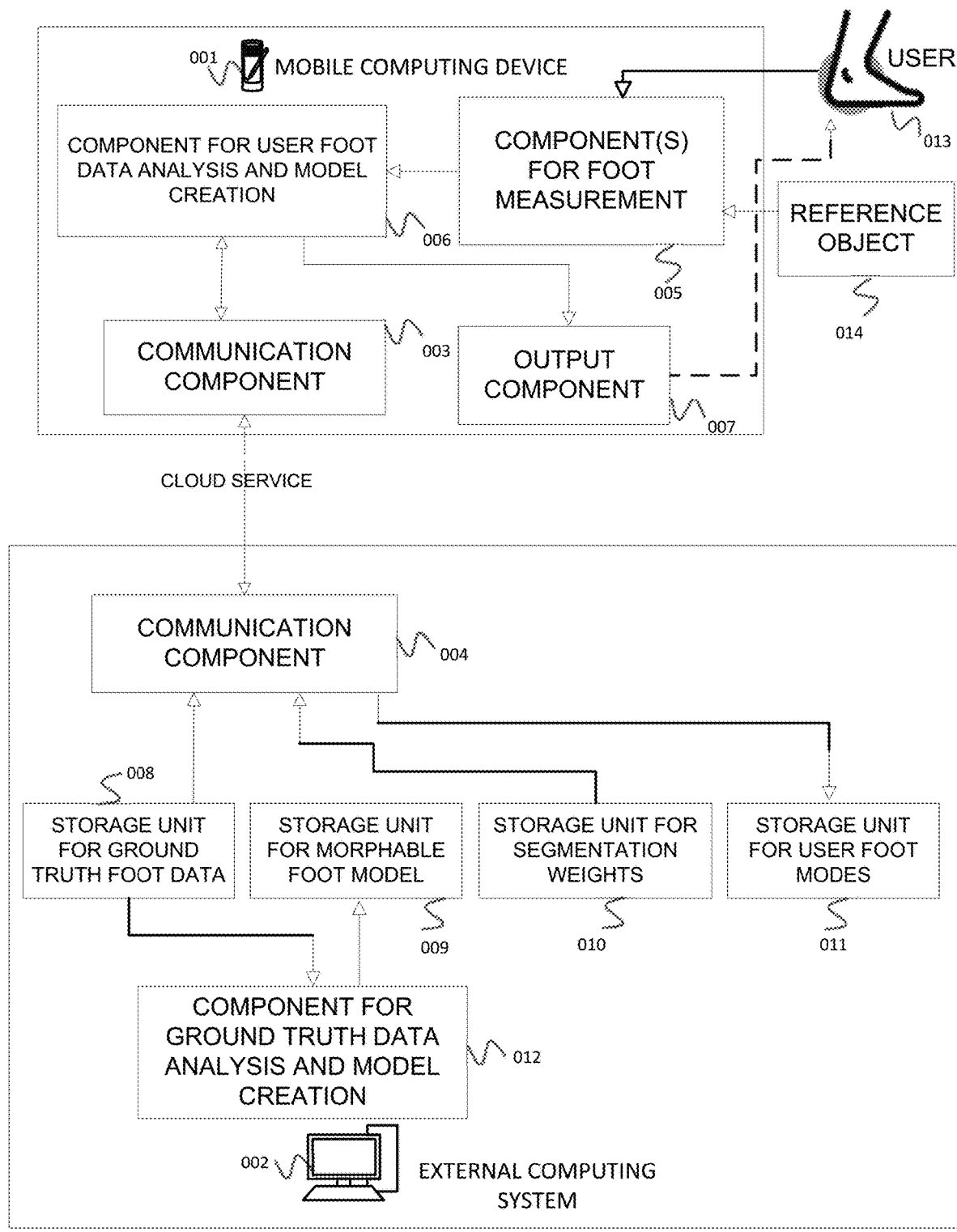
FIG. 1 is an example of a system diagram that supports creating 3D foot models via a mobile computing device in accordance with some embodiments.

FIG. 1 shows an example of an architecture of a system for creating 3D foot models for a user 013. As shown in FIG. 1, the system comprises a mobile computing device 001 and an external/remote computing system/server 002. The mobile computing device 001 and the external computing system 002 each include communication components (003 and 004, respectively) that allow them to communicate with each other over a communication network. The communication networks can be but are not limited to, internet, intranet, wide area network (WAN), local area network (LAN), wireless network, Bluetooth, WiFi, and mobile communication network. The physical connections of the network and the communication protocols are well known to those of skill in the art. The communication components typically embody computer-readable instructions, data structures, program modules or other data in a modulated data signal. By way of example, and not limitation, communication components include wired media such as a wired network or direct-wired connection, and wireless media such as acoustic, radio frequency (RF), and infrared. In an alternate embodiment, where the mobile computing device 001 and the external computing system 002 are included in the same physical entity so there is no need for these communication components.

In addition to a communication component 003, the mobile computing device 001 further comprises one or more components 005 for measuring the feet of user 013, a component 006 for analysing foot data and creating foot models, and an output component 007 for providing instructions and feedback about the foot scanning process to user 013 in one or more of visual, auditory, or tactile forms. In some embodiments, the one or more components 005 are one or more cameras and/or sensors configured to collect a plurality of data points of the feet of user 013 from different (view) points in a physical space. In some embodiments, these components are also configured to capture visual information about a reference object 014, wherein the reference object 014 is a known real-world object with known size (e.g., length and width) that can be used to calibrate cameras and sensors in the physical space. In one possible embodiment, one of the components 005 is an imaging device (e.g., a camera) and another is an inertial measurement unit. In some embodiments, the component 006 is configured to determine a scaling factor from one or more images of the reference object 014. In some embodiments, the component 006 is also configured to analyse the data captured by the components 005 and the model received from the external computing system 002 via communication component 003 to create 3D models of the feet of user 013.

In the example of FIG. 1, the external computing system 002 comprises one or more storage units for storing and maintaining the data collected and the models created or used by the mobile computing device 001. In some embodiments, the one or more storage units include a storage unit 008 for storing and maintaining ground-truth data of the user's feet as collected, e.g., by a specialized scanning device (not shown), a storage unit 009 for storing and maintaining the morphable foot models, a storage unit 010 for segmentation weights, a storage unit 011 for user foot models, and a communication component 004. In some embodiments, the external computing system 002 further includes a component 012 for ground-truth data analysis and model creation, wherein component 012 is configured to process the ground-truth data of the user's feet stored on unit 008 and create one or more 3D morphable foot models from the ground-truth data collected by the specialized scanning device to represent the manifold of probable 3D foot shapes of the user. In some embodiments, the manifold is parametrized by a (small) number (e.g., 10) of parameters in order to fit data collected and received from the mobile computing device 001. In some embodiments, component 012 is configured to store these 3D morphable foot models on unit 009. In some embodiments, communication component 004 is configured to access foot model data from storage unit 009 as well as segmentation weights from storage unit 010 and relay these data to the mobile computing device 001 via the communication component 003. In some embodiments, the communication component 004 is also configured to receive user foot models from the communication component 003 of the mobile computing device 001 and store the user foot models on unit 011. In one embodiment, all of the storage units mentioned above (008, 009, 010, and 011) are included in the same physical entity.

Figure 2:
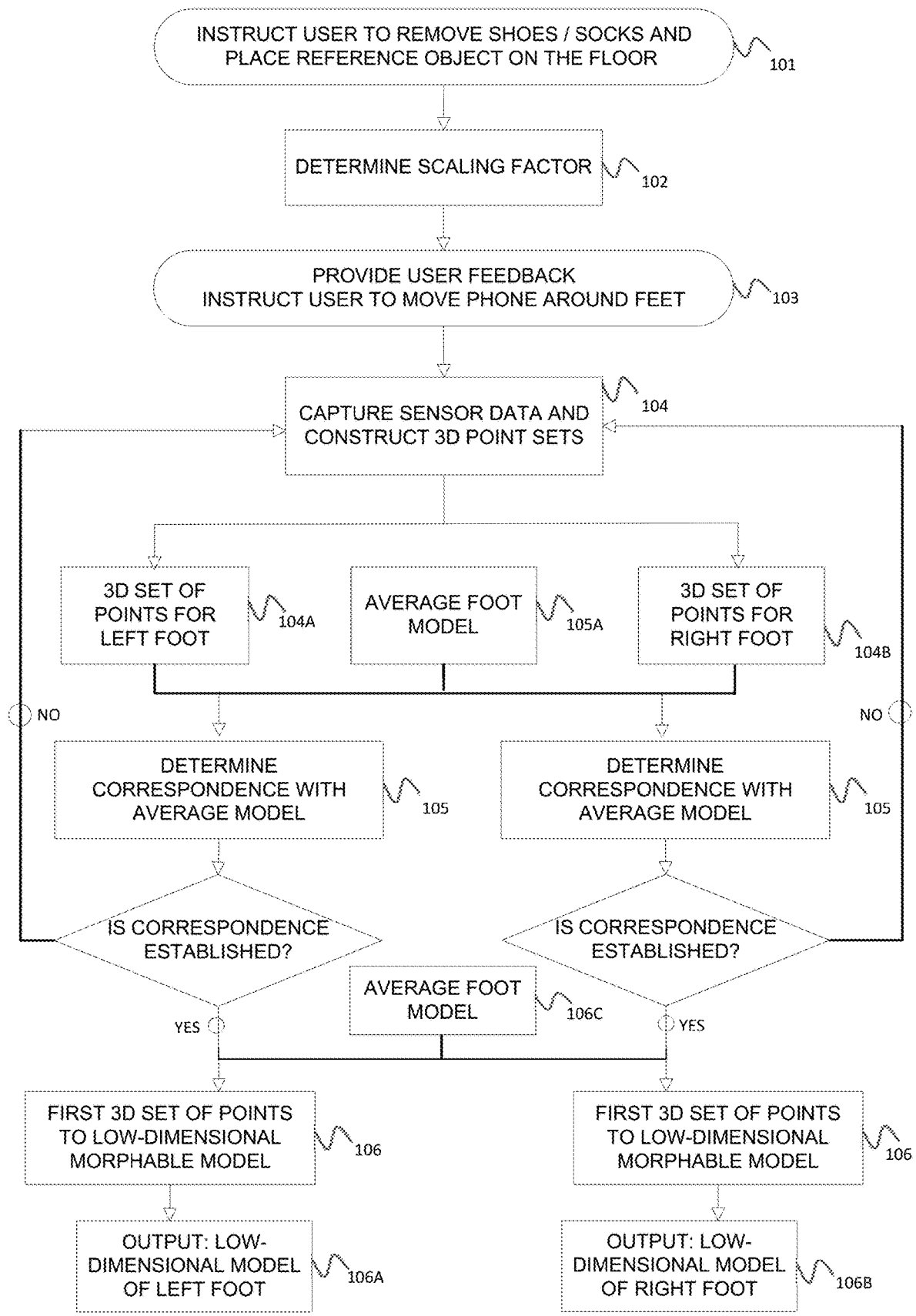
FIG. 2 is a flow chart of an example of a process for creating morphable models from scanned data of a user's feet in accordance with some embodiments.

With reference to FIG. 2, an exemplary process of scanning both feet is illustrated. In the first step 101, the user is asked to remove his or her shoes and place a reference object 014 on the floor between his or her feet. This reference object 014 should have a shape and dimensions that are uniform regardless of its manufacturer or country of origin. In some embodiments, this reference object 014 is selected to be an ISO/IEC 7810 ID-1 card, such as those used by banks, shops, and other similar organizations. In some embodiments, the user is instructed to move the mobile computing device 001 such that the reference object 014 is centered and easily visible in the view of the camera of the mobile computing device 001. It will be appreciated that the distance between the reference object 014 and each of the user's feet is irrelevant. In some embodiments, the reference object 014 may not be needed if the mobile computing device 001 has sensors properly calibrated by a manufacturer. This is the case for some modern consumer devices which include, but not limited to, Time-of-Flight or Structured-Light depth sensors with factory calibration. Such mobile communication devices may extract accurate point clouds and infer the scaling factor for the system's coordinate space from calibration data. In this case, step 102 may be omitted and scaling factor may be set as an identity transformation.

In the second step 102 depicted in FIG. 2, image data captured by the camera of the mobile computing device 001 is processed to determine a scaling factor for a coordinate system used by the mobile computing device 001 when constructing the point cloud. In some embodiments, an outline of the reference object is displayed on the screen of the mobile computing device 001 as a feedback to the user.

In the third step 103 depicted in FIG. 2, the mobile computing device 001 is configured to move/position around the user's feet and keep the user's feet stationary during the data collection process. In one embodiment, the mobile computing device 001 is configured to scan both feet of the user simultaneously as part of one continuous process. In an alternate embodiment, the mobile computing device 001 is configured to scan one foot of the user first and then the other. In the discussions hereinafter, particularly FIG. 4 and the descriptions that correspond with it, the proposed approach is discussed under the former of the two embodiments given above. For the proposed approach to be successful and regardless of which of the above embodiments is followed, the computing device 001 is configured to move and position itself such that the user's feet are seen by the device from all possible angles in order to approximate all parameters of users' feet. In some embodiments, the most crucial information can be obtained by building separate models for a top view and a side view, wherein the top view will allow measuring the user's feet's width, and the side view will allow measuring length, instep height and other parameters of the user's feet.

In the fourth step 104 depicted in FIG. 2, image data and inertial data captured by camera and/or sensors of the mobile computing device 001 are processed by the mobile computing device 001 to create a set of 3D points (referred to hereinafter as "a point cloud") 104a that represent the user's left foot and another set of 3D points 104b that represent the user's right foot. Here, the initial point cloud may have **3\*N parameters, where N is the number of points in the point cloud. Note that the number of parameters fitted for a 3D morphable model is typically much lower. For a non-limiting example, the number of parameters in a point cloud can be in the 10,000 range while the number of parameters in a 3D morphable model is around 10**.

In the fifth step 105 depicted in FIG. 2, the mobile computing device 001 is configured to establish a correspondence between the set of 3D points of the left foot's point cloud 104a of the user and points of an average foot model 105a. In one embodiment, this is done by the mobile computing device 001 via a method called Non-Rigid Iterative Closest Point (ICP). The general pipeline for Iterative Closest Point (ICP) involves the iteration of three steps until convergence. The first step is to match the closest points in the reference point set and the source point set. Here, the reference point set corresponds with the average foot model and the source point set corresponds with the left foot's point cloud. The second step is to estimate a transformation from these correspondences. The third step is to transform the source point set with the obtained transformation. Ordinary ICP estimates the transformation as a single rotation matrix and translation vector. On the other hand, Non-Rigid ICP estimates the transformation as a set of rotations and translations for each point. A correspondence between points of the right foot's point cloud 104b and points of an average foot model 105a can be established in the same manner. If the correspondence is established successfully, the system proceeds to the sixth step 106. Otherwise, processing returns to the fourth step 104.

In the sixth step 106 depicted in FIG. 2, the external computing system 002 is configured to calculate a low-parameter number 3D morphable model of each foot (106a and 106b) to incorporate tolerance to natural deformation and variation and further reduce the impact of noise from various sources, including, but not limited to, sensor data in step 104 and correspondences data from step 105. In some embodiments, this is done by optimizing the parameters of a 3D morphable model 106c that represents the average human foot 105a and the deviation from this norm in the sampled population. More specifically, the external computing system 002 is configured to tune the parameters of this model to minimize the sum of distances between corresponding points in the model 106b and the registered point cloud (104a or 104b).

Figure 3:
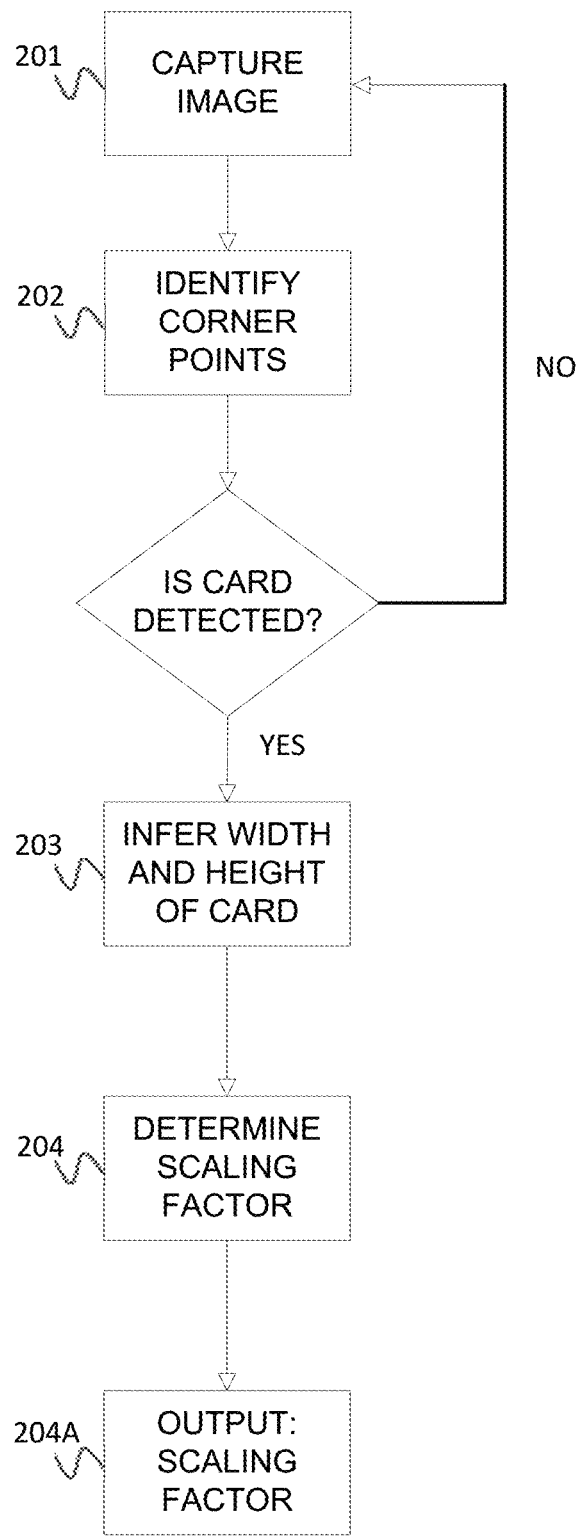
FIG. 3 is a flow chart of an example of a process for calculating a scaling factor for the system's coordinate system from images containing a reference object to the user's feet in accordance with some embodiments.

Now referring to FIG. 3, an exemplary process of determining the scaling factor is illustrated. In the first step 201, an image of the reference object is captured by the camera of the mobile computing device. In the second step 202, the image is processed by the mobile computing device 001 to identify corner points of an image of the reference object. In some embodiments, the image is converted to grayscale, smoothed, and processed by the mobile computing device 001 to identify edges. In some embodiments, an edge detector (not shown) is utilized by the mobile computing device 001 for detecting edges of the reference object. First, this edge detector of the mobile computing device 001 filters the image of the reference object in both the horizontal direction and the vertical direction. The results are then processed by the mobile computing device 001 to determine an edge gradient and a direction for each pixel in the image. In some embodiments, two threshold values, one high and one low, are set by the mobile computing device 001 and two further processing steps/passes take place. In a first pass, all pixels with edge gradients greater than the high threshold are deemed to be edge pixels. In a second pass, any pixels which are adjacent to or closely neighboring edge pixels and whose edge gradients are greater than the low threshold are also classified as edge pixels. The mobile computing device 001 then finds contours in the image which contain four edges and identifies the corresponding corner points of these contours. Finally, the mobile computing device 001 applies a classifier to check whether the object detected corresponds to what the reference object should look like. If a correspondence is found, the mobile computing device 001 continues to the third step. If the correspondence is not found, the first step is repeated.

In the third step 203 depicted in FIG. 3, the width and height of the reference object are inferred from its corner points. In the fourth step 204, the calculated width and height are compared to known dimensions of the reference object to determine a scaling factor 204a for the coordinate system used by the mobile computing device 001.

Figure 4:
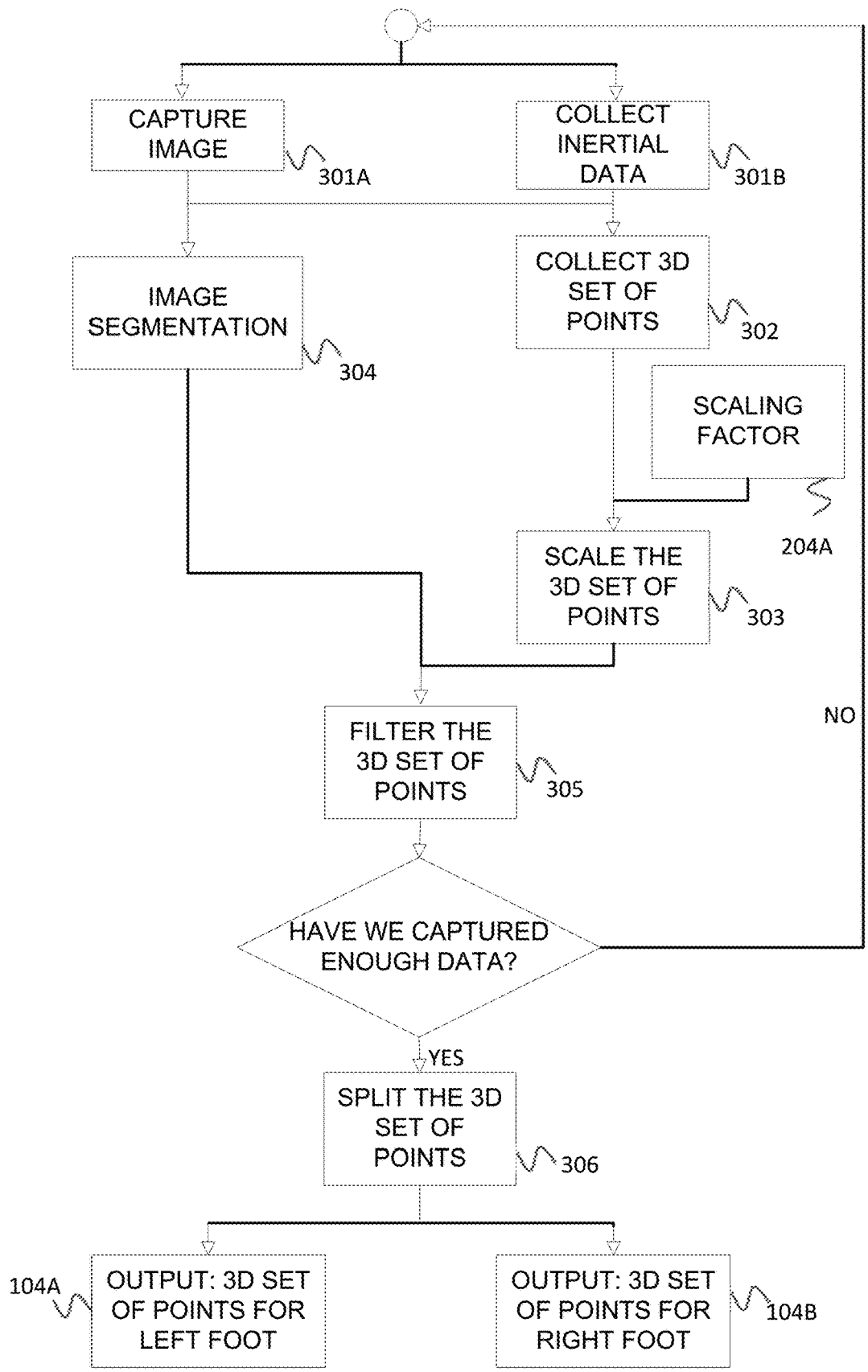
FIG. 4 is a flow chart of an example of a process for computing 3D point sets from sensor data to represent the user's feet in accordance with some embodiments.

Now referring to FIG. 4, an exemplary process of calculating points clouds for the two feet is illustrated. In the first step (301a and 301b), image data and inertial measurements are captured by the mobile computing device 001. In the second step 302 depicted in FIG. 4, a 3D point cloud of the user's feet is constructed by the mobile computing device 001. In one embodiment, this is done using Simultaneous Localization and Mapping (SLAM). The SLAM method includes estimation of the 3D motion of a sensor platform in an environment (also known as ego-motion) and mapping its surrounding scene at the same time. Images are processed by the mobile computing device 001 to identify and match 2D feature points for successive frames. Here, the sensor platform can be a piece of hardware (e.g., the mobile computing unit 001) containing a camera, an IMU, etc. In some embodiments, the sensor platform may further include an external camera connected to the computing unit. In some embodiments, the correspondences are fused by the mobile computing device 001 with inertial measurements and a calculation is performed to determine an estimate of the sensor platform's location. With a known location of the sensor platform, the matched 2D feature points can be expressed in 3D and their aggregate set becomes what is referred to as a "point cloud". In some embodiments, the SLAM method may be generalized to utilize depth sensor data if it is available. In this case it is not necessary to match 2D feature points. Since depth maps have corresponding 3D point cloud representations, these representations may be used to estimate the sensor platform's location by Iterative Closest Point or other point set registration algorithms. The 3D point clouds can then be fused into a single representation with help of voxel grid fusion or point cloud fusion. This final fused representation will be then used in consequent steps of this algorithm.

In the third step 303 depicted in FIG. 4, the point cloud is scaled using the factor(s) 204a determined in the method of FIG. 3. In the fourth step 304, the input image is segmented by the mobile computing device 001 to identify regions that correspond to the user's feet. In one embodiment, this segmentation is done with a Convolutional Neural Network (CNN), wherein CNN is a specific kind of neural network with a unique architecture. Traditionally, neural networks have multiple layers of neurons (an input layer, output layer and one or more so-called hidden layers) where each neuron computes a weighted sum of all its inputs, followed by a non-linear function to restrict its output value within a reasonable range. CNN is a neural network that uses a small 1-D or 2-D array of weights that are convolved with the inputs. These convolutions allow for translation invariance and reduce the number of trainable parameters.

Figure 6:
FIG. 6 is an example of an image which has been segmented into classes corresponding to the user's left foot, the user's right foot, the user's lower left leg, the user's lower right leg, the floor, and the reference object in accordance with some embodiments.

In one embodiment, a CNN is trained by the external computing system 002 with reference to a plurality of classes, including but not limited to the left foot, the left lower leg, the right foot, the right lower leg, the floor, and the reference object. It should be noted that, in this embodiment, the class of "lower leg" refers only to visible skin above the foot. In some embodiments, the plurality of classes used for training the CNN is represented as values of network weights, which relate the various network layers to one another. To perform segmentation, the CNN processes the input data to assign, for each image pixel, a likelihood probability for each of the classes. FIG. 6 depicts a non-limiting example of an image taken from the mobile computing device's 001 camera (one of the components 005 for foot measuring) overlayed by the CNN output where colors correspond to the most likely class for one possible embodiment.

Figure 7:
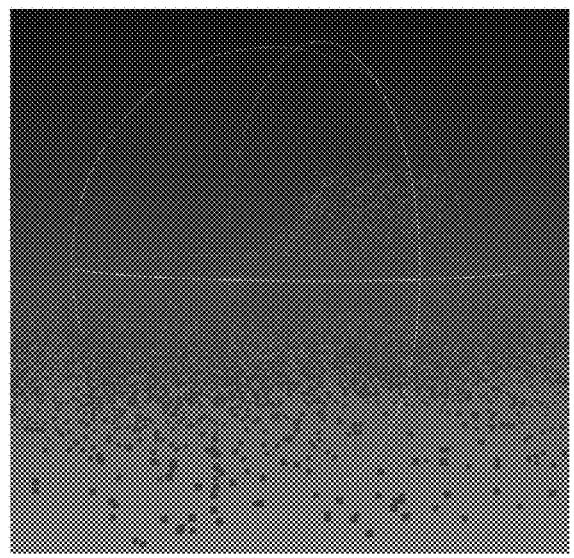
FIG. 7 is an example of an unfiltered 3D point set ("point cloud") of one of the user's feet in accordance with some embodiments.
Figure 8A:
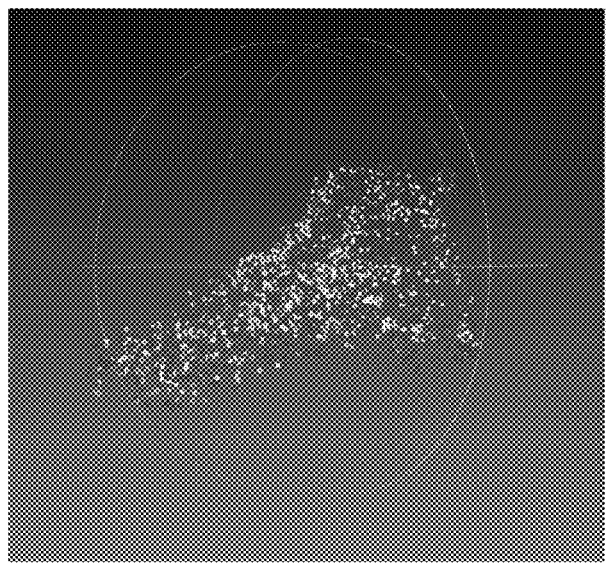
FIGS. 8A-8C are examples of a 3D point set ("point cloud") that has been filtered to contain only those points that represent the user's foot in accordance with some embodiments.
Figure 8B:
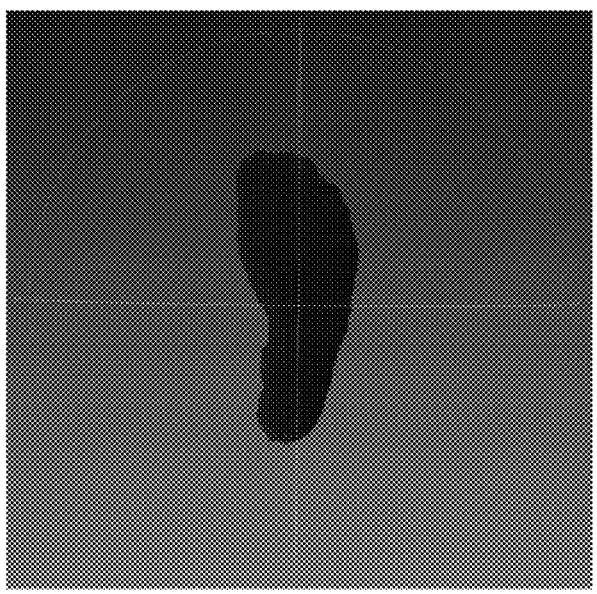
Figure 8C:
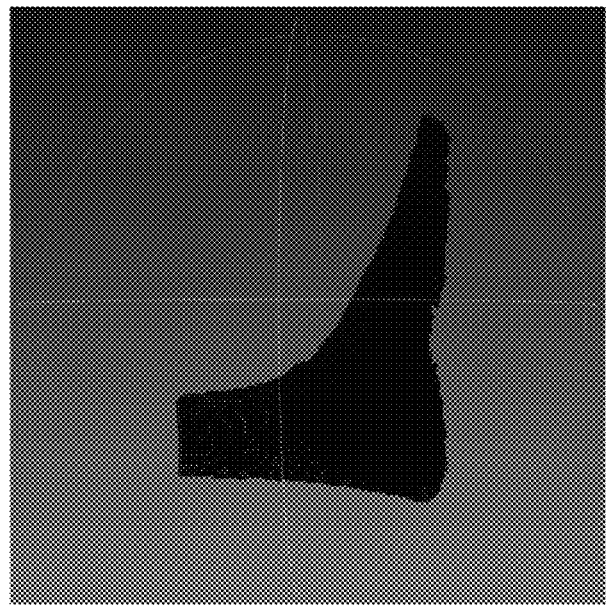

In the fifth step 305 depicted in FIG. 4, the point cloud is filtered by the mobile computing device to preserve only those points that correspond with the user's feet. This is done by projecting each point in the point cloud to the camera plane and then determining the corresponding classification of the point using the segmentation calculated in the fourth step above. Points whose class does not correspond to either the left foot or the right foot are discarded. If the filtered result is deemed to be satisfactory, processing continues to the sixth step. Otherwise, processing returns to the first step depicted in FIG. 4. A non-limiting example of the point cloud before the filtering is depicted in FIG. 7. Non-limiting examples of the point cloud after the filtering stage are depicted in FIGS. 8A-8C. In case of low noise in point cloud's point locations, the point segmentation can be simplified. In some embodiments, the point cloud may be grouped into clusters, wherein the clusters that correspond to a user's feet are found with help of heuristics. In one embodiment, a user interface may guide user to place the user's feet in a specific spot. The clusters that have a large number of points near this spot will contain the user's feet.

In the sixth step 306 depicted in FIG. 4, the point cloud is split in two by the mobile computing device 001: one for left foot 104a and one for the right foot 104b. In one embodiment, the point cloud can be split using segmentation methods. In an alternate embodiment, the point cloud can be split using clustering techniques.

Figure 5:
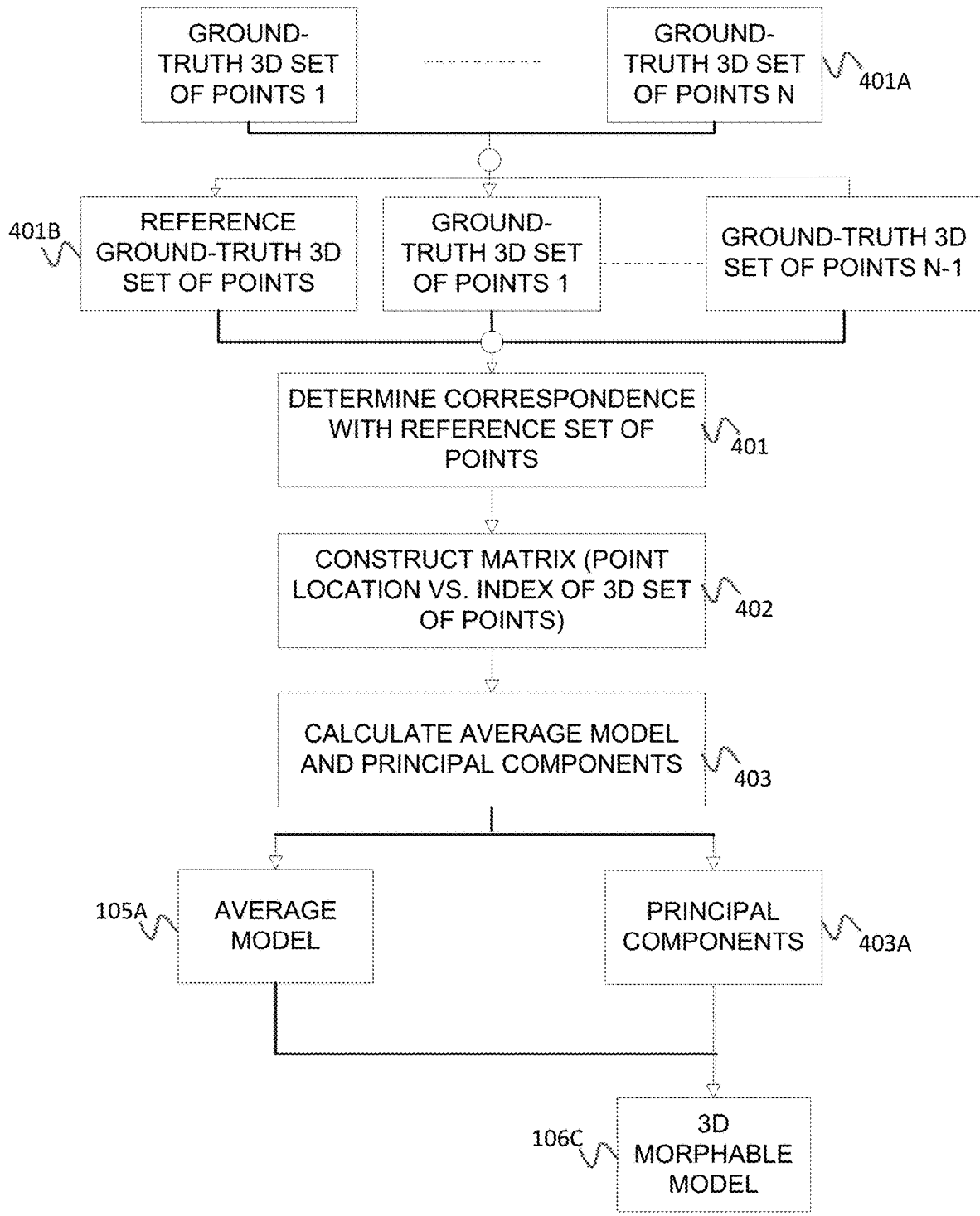
FIG. 5 is a flow chart of an example of an offline process for creating an average foot model and a 3D morphable model from a set of ground truth 3D point sets in accordance with some embodiments.

Now referring to FIG. 5, an exemplary offline process of calculating the average foot model 105a and the 3D morphable model 106c by the external computing system 002 is illustrated. From a set of ground-truth data/point clouds 401a created by a special device (e.g., a professional hardware scanner), one point cloud 401b is selected to serve as a reference. In the first step 401 depicted in FIG. 5, the external computing system 002 finds correspondences between the points of the reference point cloud and each of the other point clouds. In one embodiment, this is done using Non-Rigid ICP and nearest-neighbor correspondences.

Figure 9:
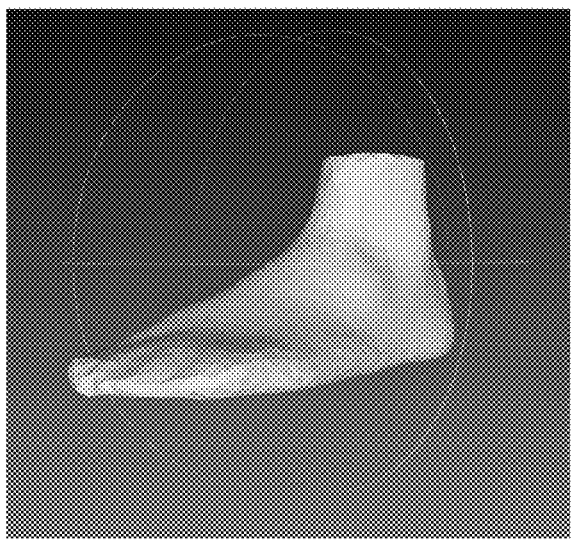
FIG. 9 is an example of a visual representation of a morphable model of a user's foot in accordance with some embodiments.

In the second step 402 depicted in FIG. 5, a matrix is created by the external computing system 002, in which each row corresponds to a unique point cloud and each column corresponds to a unique point location. In the third step 403 depicted in FIG. 5, the matrix is processed by the external computing system 002 to determine an average model 105a and a low-parameter number set of values 403a that describe the variance of the input data. In one embodiment, this processing is done with a technique called Principal Component Analysis (PCA), which performs a basis transformation to an orthogonal coordinate system formed by the eigenvectors $s_i$ of the matrix in step 402 above: $S = \overline{S} + \sum_{i=1}^{m-1} \alpha_i s_i, \alpha \in \Re^{m-1}$. Here, $\overline{S}$ is the average model 105a, the eigenvectors $s_i$ are the values 403a that describe the variance of the input data (known also as "principal components") and S is the more general, low-parameter number morphable model 106c. The parameters $\alpha_i$ are the parameters tuned in the sixth step 106 of FIG. 2 to calculate low-parameter number models of the user's feet (106a and 106b). A non-limiting example of the 3D mesh of the fitted 3D morphable model is depicted in FIG. 9. Note that the 3D morphable model helps to reconstruct feet from noisy and incomplete data. However, if some conditions are met, then the 3D morphable model may be omitted and foot measurements can be taken directly from a point cloud. It is important that the point cloud is dense enough, roughly 1 mm or less between neighboring points and it is important that point locations do not contain a lot of noise. This is the case when a mobile computing device 001 has thoroughly calibrated depth sensors.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A three-dimensional (3D) modeling system configured to generate models of a left and/or right foot of a user, the system comprising a mobile computing device configured to:
   scan and/or capture data of the user's left and/or right foot from a top view or a side view via one or more imaging devices and one or more sensors of the mobile computing device;
   process the captured data to create separate point clouds via Iterative Closest Point (ICP) estimates of a transformation for the top view or the side view;
   match each of the point clouds of the left and/or right foot of the user with a 3D model of an average corresponding foot to establish a correspondence between each of the point clouds of the left and/or right foot of the user and the 3D model of the average corresponding foot;
   calculate one or more 3D morphable models from the point clouds to fit the left and/or right foot of the user, respectively;
wherein the one or more 3D morphable models are built for the top view to obtain a width of the left and/or right foot or the side view to obtain a length and an instep height of the left and/or right foot.

2. The system of claim 1, wherein:
each of the one or more imaging devices is one of a RGB camera and a depth camera configured to capture image data of the user's left and/or right foot from different points in a 3D space.

3. The system of claim 2, wherein:
the mobile computing device is configured to segment the image data to identify regions that correspond to the user's left and/or right foot via a Convolutional Neural Network (CNN).

4. The system of claim 1, wherein:
one of the one or more sensors is an inertial measurement unit (IMU) configured to capture inertial data of the user's left and/or right foot from different points in a 3D space.

5. The system of claim 1, wherein:
the mobile computing device is configured to capture visual information about a reference object when constructing the point clouds of the user's left and/or right foot, wherein the reference object is an object with a known length and a known width formed by various points in a 3D space.

6. The system of claim 5, wherein:
the mobile computing device is configured to determine a scaling factor for a coordinate system used when constructing the point clouds from the visual information of the reference object.

7. The system of claim 1, wherein:
the mobile computing device is configured to determine the scaling factor via the one or more depth sensors without using a reference object.

8. The system of claim 1, wherein:
the mobile computing device is configured to filter the point clouds to preserve only those points that correspond with the user's left and/or right foot.

9. The system of claim 1, wherein:
the mobile computing device is configured to process the one or more morphable models in terms of one or more model parameters.

10. The system of claim 1, wherein:
the mobile computing device is configured to transmit the one or more morphable models directly to a compatible online merchant.

11. The system of claim 1, wherein:
the mobile computing device is configured to provide instructions and/or feedback about fitting of the one or more morphable models to the user in one or more of visual, auditory, and tactile forms.

12. The system of claim 1, wherein:
the mobile computing device is configured to incorporate tolerance to natural deformation and variation to reduce an impact of noise in the point clouds while generating the one or more morphable models.

13. The system of claim 1, further comprising:
an external computing system comprising one or more storage units configured to store and maintain the data collected and models created or used by the mobile computing device.

14. The system of claim 13, wherein:
the external computing system further comprises a component configured to:
   process ground-truth data of the user's left and/or right foot stored on the one or more storage units;
   create the 3D model of the average corresponding foot and a low-parameter number set of values that describe a feet variance from the ground truth data of the user's left and/or right foot.

15. The system of claim 1, wherein:
the mobile computing device is configured to calculate the correspondences between the point clouds via the ICP.

16. The system of claim 1, wherein:
the mobile computing device is further configured to capture additional data of the user's left and/or right foot from a second view and building an additional 3D morphable model for the second view to obtain an additional parameter.

17. The system of claim 1, wherein:
the mobile computing device is configured to incorporate tolerance to natural deformation and variation in the one or more 3D morphable models to reduce an impact of noise from one or more sources.

18. The system of claim 1, wherein:
the mobile computing device is configured to reduce the number of parameters in the one or more 3D morphable models to be lower than in the point clouds.

19. A method for three-dimensional (3D) modeling of a left and/or right foot of a user, the method comprising:
scanning and/or capturing data of the user's left and/or right foot from a top view or a side view via one or more cameras and one or more sensors of a mobile computing device;
processing the captured data to create one or more point clouds via Iterative Closest Point (ICP) estimates of a transformation for the top view or the side view;
matching each of the point clouds of the left and/or right foot of the user with a 3D model of an average corresponding foot to establish a correspondence between each of the point clouds of the left and/or right foot of the user and the 3D model of the average corresponding foot;
calculating one or more 3D morphable models from the point clouds to fit the left and/or right foot of the user, respectively, wherein the one or more 3D morphable models are built for the top view to obtain a width of the left and/or right foot or the side view to obtain a length and an instep height of the left and/or right foot.

20. The method of claim 19, further comprising:
reducing the number of parameters in the one or more 3D morphable models to be lower than in the point clouds.

21. The method of claim 20, further comprising:
capturing image data of the user's left and/or right foot from different points in a 3D space via the one or more imaging devices;
segmenting the image data to identify regions that correspond to the user's left and/or right foot via a Convolutional Neural Network (CNN).

22. The method of claim 20, further comprising:
capturing inertial data of the user's left and/or right foot from different points in a 3D space via an inertial measurement unit (IMU).

23. The method of claim 20, further comprising:
capturing visual information about a reference object when constructing the point clouds of the user's left and/or right foot, wherein the reference object is an object with a known length and a known width formed by various points in a 3D space;
determining a scaling factor for a coordinate system used when constructing the point clouds from the visual information one or more images of the reference object.

24. The method of claim 19, further comprising:
determining the scaling factor via the one or more depth sensors without using a reference object.

25. The method of claim 20, further comprising:
capture additional data of the user's left and/or right foot from a second view and building an additional 3D morphable model for the second view to obtain an additional parameter.

26. The method of claim 20, further comprising:
filtering the point clouds to preserve only those points that correspond with the user's left and/or right foot.

27. The method of claim 20, further comprising:
processing the one or more morphable models to describe the user's left and/or right foot in terms of one or more parameters.

28. The method of claim 20, further comprising:
transmitting the one or more morphable models directly to a compatible online merchant.

29. The method of claim 20, further comprising:
providing instructions and/or feedback about fitting of the one or more morphable models to the user's left and/or right foot in one or more of visual, auditory, and tactile forms.

30. The method of claim 20, further comprising:
incorporating tolerance to natural deformation and variation to reduce an impact of noise in the point clouds while generating the one or more morphable models.

31. The method of claim 20, further comprising:
processing ground-truth data of the user's left and/or right foot stored on one or more storage units;
creating the 3D morphable models of the average corresponding foot and a low-parameter number set of values that describe a feet variance from the ground truth data of the user's left and/or right foot.

32. The method of claim 20, further comprising:
calculating correspondences between the point clouds via the ICP.

33. The method of claim 20, further comprising:
incorporating tolerance to natural deformation and variation in the one or more 3D morphable models to reduce an impact of noise from one or more sources.

* * * * *